United States Patent [19]

Baba et al.

[11] Patent Number: 4,878,649

[45] Date of Patent: Nov. 7, 1989

[54] THROTTLE DEVICE FOR HIGH VISCOSITY PAINT

[75] Inventors: Youichiro Baba; Hirofumi Hashimoto, both of Toyota; Masayuki Watanabe, Aichi, all of Japan

[73] Assignee: Toyota Jidosha Kabushiki Kaisha, Toyota, Japan

[21] Appl. No.: 219,402

[22] Filed: Jul. 15, 1988

[30] Foreign Application Priority Data

Jul. 24, 1987 [JP] Japan ................................ 62-183702

[51] Int. Cl.[4] ........................... B05B 9/00; F15D 1/10; F16K 47/06

[52] U.S. Cl. ....................................... 251/121; 138/44; 138/46; 239/127

[58] Field of Search ..................... 251/121; 138/40, 46, 138/44; 239/127, 126

[56] References Cited

U.S. PATENT DOCUMENTS

| | | | |
|---|---|---|---|
| 2,341,394 | 2/1944 | Sloan | 138/46 X |
| 2,781,059 | 2/1957 | Frey | 138/46 |
| 3,816,025 | 6/1974 | O'Neill | 239/127 X |
| 4,576,204 | 3/1986 | Smallhorn | 138/40 X |

FOREIGN PATENT DOCUMENTS

| | | | |
|---|---|---|---|
| 60-101287 | 7/1985 | Japan . | |
| 60-121596 | 8/1985 | Japan . | |
| 60-147873 | 10/1985 | Japan . | |
| 62-6594 | 1/1987 | Japan . | |
| 1079474 | 8/1967 | United Kingdom | 251/121 |

*Primary Examiner*—Arnold Rosenthal
*Attorney, Agent, or Firm*—Finnegan, Henderson, Farabow, Garrett & Dunner

[57] ABSTRACT

A throttle device for applying a back pressure to a high viscosity point in an airless paint supply system. The throttle device comprises a tube member having an inner through hole and an elongated core member inserted in the tube member and extending along the length of the tube member. A support means supports the core member relative to the tube member and a clearance is provided between the tube member and the core member to constitute a passage for the paint, the clearance being equal to or larger than 1.5 millimeters, and the length of the tube member being selected in relation to the clearance so as to cause a required loss of pressure.

12 Claims, 3 Drawing Sheets

THROTTLE DEVICE FOR HIGH VISCOSITY PAINT

BACKGROUND OF THE INVENTION

1. Field of the Invention

The present invention relates to a throttle device for a paint having a high viscosity, and used in an airless paint supply system.

2. Description of the Related Art

In a conventional airless paint supply system, a back pressure is applied to a high viscosity paint in a paint supply line, to allow a spray gun to emit paint at a high pressure, and for this purpose, a throttle valve is used. Two conventional types of throttle valves are used for a high viscosity paint; i.e., one having a high pressure regulator having a movable valve means, and another having an orifice tube having a constant small opening area. Currently, the orifice tube type is most widely used, since the high pressure regulator type suffers from a problem of the endurance of the movable parts thereof. A typical example of such an orifice tube type valve is shown, for example, in Japanese Unexamined Utility Model Publication No. 62-6594.

The orifice tube provides a flow resistance, to cause a loss of pressure in the flow of paint flowing therethrough, and thus can apply a back pressure to paint in the paint supply system. To apply a high back pressure, the orifice passage of the orifice tube must be very long and have a very small diameter. For example, the orifice passage must be 1 mm in diameter and 42 mm in length to provide a back pressure of 100 kgf/cm$^2$. If the diameter is enlarged the length must be increased accordingly. To generate a similar loss of pressure, for example, the length must be 750 mm, if the diameter is 2 mm; and must be 4000 mm, if the diameter is 3 mm. It becomes very difficult to use such an excessively long orifice tube.

Therefore, in practice, an orifice passage having a smaller diameter is used, and in general, an orifice passage as described above that is 1 mm in diameter and 42 mm in length is used. But the paint often includes dust or foreign matter, and thus the orifice tube is often clogged; and when the orifice tube becomes clogged, it is difficult to clean same since the orifice passage is very narrow, as stated above. Also, the paint flow velocity becomes higher in such a narrow orifice, so that if the paint including an abrasive material, such as an interlayer chipping resistant paint, is used, wear of the inner surface of the orifice passage occurs and thus the opening area is enlarged.

SUMMARY OF THE INVENTION

The object of the present invention is to provide a throttle, device for a high viscosity paint, which generates a necessary loss of pressure but does not cause clogging.

According to the present invention, there is provided a throttle device for applying a back pressure to a high viscosity paint in an airless paint supply system including a paint supply pump for supplying paint toward the throttle valve. The throttle device comprises a tube member having an inlet, an outlet, and an inner through hole formed therein between the inlet and the outlet, an elongated core member inserted in the inner through hole of the tube member and extending substantially along the length of the tube member, and a support means for supporting the core member relative to the tube member, whereby a clearance is provided between the tube member and the core member to constitute a passage allowing a flow of the paint, the clearance being equal to or larger than 1.5 millimeters and the substantial length of the tube member being selected in relation to the clearance so as to cause a required loss of pressure in the paint.

The throttle device for a high viscosity paint, in accordance with the present invention, can generate a required loss of pressure and substantially prevent clogging. Also, the area of the passage defined by the clearance is relatively large, so that wear of the surface of the throttle device in contact with the paint is reduced, even if the paint used would have caused wear in a conventional throttle valve, and a predetermined clearance can be maintained over a long period of use, to thereby generate a stable loss of pressure.

BRIEF DESCRIPTION OF THE DRAWINGS

The other features and advantages of the present invention will become more apparent from the following description of the preferred embodiment with reference to the accompanying drawings, in which.

DESCRIPTION OF THE PREFERRED EMBODIMENTS

Figure 1:
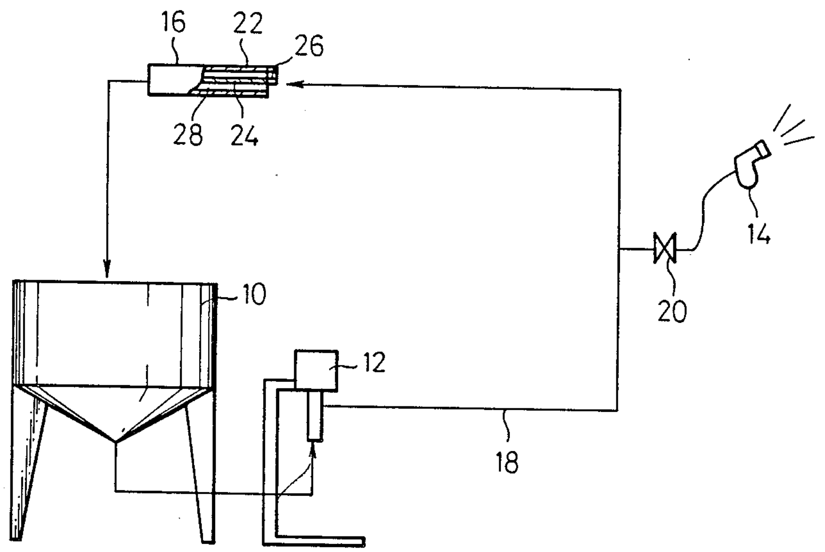
FIG. 1 is a view of an airless paint supply system including a throttle device for applying a back pressure according to the present invention.

Referring to FIG. 1, an airless paint supply system, according to the present invention, comprises a paint tank 10, a paint supply pump 12, a paint spray gun 14, a throttle device 16, and a paint supply line 18 for recirculating the paint. A delivery means 20 comprising a pressure reducing valve or the like is provided near to the paint spray gun 14. The throttle device 16 is used to maintain the pressure of the paint in the paint supply line 18 at a desired high level, to thereby apply high back pressure (80–150 kgf/cm$^2$) to the paint spray gun 14. Therefore, the throttle device 16 must allow a large loss of pressure when paint is passed therethrough. Also, in this system, the output of the paint supply pump 12 can be controlled in accordance with the amount of paint consumed by the paint spray gun 14, so that a constant back pressure is normally generated.

The throttle device 16 comprises a tube member 22 having an inlet and an outlet at the opposite ends thereof and an inner through hole formed therein between the inlet and the outlet. The throttle device 16 also comprises an elongated core member 24 inserted in the inner through hole of the tube member 22 and extending substantially along the length of the tube member 24, and a support means 26 for supporting the core member 24 relative to the tube member 22. A clearance 28 is provided between the tube member 22 and the core member 24 to constitute a passage allowing a flow of paint. Note, this clearance 28 is equal to or larger than 1.5 millimeters and the length of the tube member 22 is selected in relation to the clearance 28, so as to cause a required loss of pressure in the paint.

Figure 2:
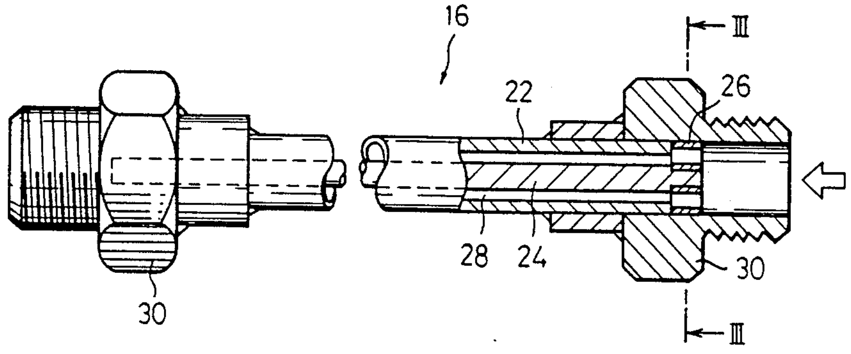
FIG. 2 is an enlarged sectional view of the throttle device in FIG. 1.
Figure 3:
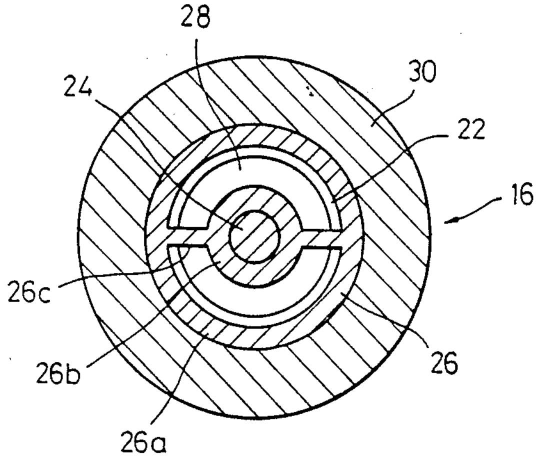
FIG. 3 is a sectional view of the throttle device, taken along the line III—III in FIG. 2.

FIGS. 2 and 3 show the throttle device 16 in FIG. 1 in greater detail. The tube member 22 is comprised of a straight tube having an inner diameter of 6 mm and length of 262 mm. Pipe fitting members 30 have an inner bore allowing them to be fitted over tube member 22 and are welded to the tube member 22 at either end thereof, to enable the connection of the tube member 22 to an associated pipe member in the system. Note, the core member 24 has an outer diameter of 3 mm, and thus the clearance 28 between the tube member 22 and the core member 24 is 1.5 mm.

In FIG. 2, the direction of the flow of paint is shown by an arrow. The support means 26 is preferably located only at one end of the tube member 22 and the core member 24, at the paint inlet side, in this embodiment, but a similar or other support means can be located at the other end thereof.

As shown in FIGS. 2 and 3, the support means 26 is formed by concentric ring or tube members and is arranged at the ends of the tube member 22 and the core member 24. Particularly, the support means 26 comprises an outer ring or tube member 26*a*, an inner ring or tube member 26*b*, and bridge portions 26*c* interconnecting the outer and inner ring members 26*a* and 26*b*. The outer ring member 26*a* has an outer diameter corresponding to the inner diameter of the inner bore of the pipe fitting member 30 and an inner diameter larger than that of the inner through hole of the tube member 22, whereby the outer ring member 26*a* is held in the pipe fitting member 30 in an axial abutment relationship with the tube member 22, without disturbing the flow of paint entering the tube member 22. The inner ring member 26*b* can be engaged with the core member 24 to support same. Preferably, the core member 24 has an axially extending end projection having a diameter smaller than that of the core member 24, as shown in FIG. 2, and the inner ring member 26*b* has an inner diameter which allows the inner ring member 26*b* to fit on that end projection to support the core member 24 coaxially to the tube member 22. The outer diameter of the inner ring member 26*b* is such that there is no disturbance of the flow of paint entering the tube member 22.

Accordingly, the support means 26 per se constitutes a clearance similar to or larger than the clearance 28 between the tube member 22 and the core member 24, to allow the flow of paint, and can support the core member 24 relative to the tube member 22 so that the latter members can be maintained at the required clearance 28. Note, the support means 26 is not mechanically fixed to the tube member 22, but is forced by the pressure of the flowing paint during use to rest against the end surface of the tube member 22. Therefore, it is possible to withdraw the core member 24 together with the support means 26 from the tube member 22, and thus it easy to clean the tube member 22 and the core member 24. Further, in this embodiment, the other end of the core member 24 is not supported and drops and rests on the inner surface of the tube member 22 when paint does not flow, but, when the paint is flowing, the other end of the core member 24 is lifted at a center of the tube member 22.

Note, the clearance 28 (1.5 mm) between the tube member 22 and the core member 24 and the length (262 mm) of the tube member 22 and the core member 24, as above described, are determined in accordance with the kind of paint to be used and the required loss of pressure. The above example was determined under the conditions that a paint of vinyl chloride sol (specific gravity : 1.46; coefficient of viscosity : 0.05 kgf·S/m$^2$) had a rate of flow of 600 ml per minute and a loss of pressure of 100 kgf/cm$^2$ was required. The Reynolds number (Re) in this case was 3.8, and thus the flow was a laminar flow. The coefficient of friction in the tube was 25.2. To determine the clearance 28 between the tube member 22 and the core member 24, and the length of the tube member 22 and the core member 24, reference can be made to a calculation method described in the Mechanical Design Handbook, pages 1936–1943, published by Maruzen in 1948 in Japan. Also, this type of throttle device 16 is adapted only for a high viscosity paint, and it is practically impossible to use such a throttle device for a low viscosity paint, since the length of the tube member 22 and the core member 24 would have to be infinite in such a case.

According to the present invention, the clearance 28 between the tube member 22 and the core member 24 must be equal to or larger than 1.5 millimeters. This is based on the inventors' findings from past experience and experiments that the majority of dust or foreign matter causing the clogging of conventional orifice tubes have a diameter of from 0.5 to 1.5 mm, and therefore, the clearance 28 between the tube member 22 and the core member 24 must be equal to or larger than 1.5 millimeters. In relation to this clearance 28, the length of the tube member 22 by which a loss of pressure of 100 kgf/cm$^2$ can be obtained is 262 mm. Therefore, it is possible to obtain a loss of pressure of 100 kgf/cm$^2$ with a shorter length tube member, compared to a conventional orifice passage, with a diameter of 1.5 mm, and it is possible to substantially prevent clogging by dust or foreign matter since the clearance 28 extends circumferentially while maintaining the restriction of 1.5 mm. Also, it is possible, as described above, to withdraw the core member 24 from the tube member 22, to clean the throttle device 16. Note, if the upper limit of the clearance 28 is not kept within 3 mm, the length of the tube member 22 and the core member 24 must be made too long for practical use.

Figure 4A:
FIGS. 4A and 4C show various modifications of the core member.
Figure 4B:
Figure 4C:

As shown in FIGS. 4A and 4C, the core member 24 can be provided with a desired engraved pattern on the outer surface thereof, to increase the flow resistance and thus enhance the back pressure, whereby the length of the tube member 22 and the core member 24 can be shortened for a given value of the clearance 28. FIG. 4A shows a cylindrical core member 24 with a rugged surface; FIG. 4B shows a cylindrical core member 24 with a spiral groove on the outer surface thereof; and FIG. 4C shows a cylindrical core member 24 with a knurled surface.

Figure 5:
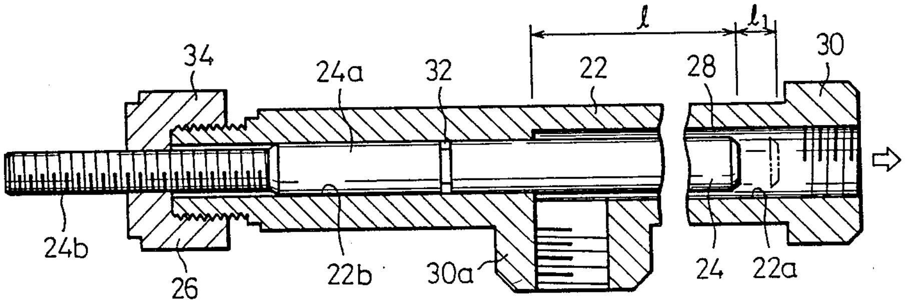
FIGS. 5 is a view of the throttle device 25 according to the second embodiment of the present invention.

FIG. 5 shows a second embodiment of the present invention, in which the core member 24 is supported relative to the tube member 22 so that the effective length of the tube member 22 is adjustable. In this embodiment, the tube member 22 includes two tube portions, i.e., a main tube portion having an inner through hole 22*a*, which constitutes the clearance 28 in question, and an extension tube portion having an additional inner through hole 22*b*. The tube member 22 is straight so that the two tube portions are linear and integral to each other and the inner through holes 22*a* and 22*b* are consecutive, and the clearance 28 between the tube member 22 and the core member 24 is equal to or larger than 1.5 millimeters. A pipe fitting 30 is fitted at the righthand end of the tube member 22 and another T-shaped pipe fitting 30a is laterally fitted at an intermediate position on the tube member 22, i.e., perpendicular to the internal end of the main tube portion. Therefore, paint can flow, for example, from the pipe fitting 30a to the pipe fitting 30 through the clearance 28.

The core member 24 is extended to constitute a support means for the core member 24 relative to the tube means, and includes an extension shaft portion 24a linearly and integrally extending from the core member 24. This extension shaft portion 24a is slidably fitted in the additional inner through hole 22 of the extension tube portion. A seal ring 32 is arranged between the extension shaft portion 24a and the extension tube portion to prevent a leakage of paint therethrough.

The extension shaft portion 24a of the core member 24 has an outer end portion 24b having a thread, and a thread is also provided on the end of the extension tube portion. A lock nut 34 having internal stepped threads is engaged with the thread of the outer threaded end portion 24b and the thread of the end of the extension tube portion, to thereby secure the extension shaft portion 24a at a desired axial position relative to the extension portion of the tube member 22. When carrying out the adjusting and securing operation, the lock nut 34 is engaged with the thread of the outer end portion 24b and driven toward the end of the extension tube portion after the core member 24 is located at a desired axial position relative to the tube member 22, and then finally engaged simultaneously with the thread of the end of the extension tube portion and the thread of the outer end portion 24b. Therefore, the effective length of the clearance 28 can be varied, as represented by the length "l", or "l+l", in accordance with the paint to be used or other conditions such as a desired back pressure.

We claim:

1. A throttle device for applying back pressure to a high viscosity paint in an airless paint supply system having a paint supply pump for supplying paint to a paint spray gun and through the throttling device, said throttling device, comprising:

a tubular member having an inlet and outlet adjacent opposite ends and an inner surface defining a cylindrical through hole of uniform diameter extending axially between the inlet and outlet;

an elongated core member having a uniform outer cylindrical surface concentrically disposed in the through hole and extending substantially throughout the length of the tubular member;

support means mounting the core member in said concentric disposition;

the cylindrical surface of the core member and the inner surface of the tubular member being diametrically dimensioned to define an annular passage between the inner surface of the tubular member and outer surface of the core member having an annulus of at least 1.5 millimeters in radial dimension to permit a flow of paint therethrough while maintaining a selected loss of pressure at the paint spray gun; and the ratio of the axial length of the annular passage and the radial dimension of the annulus being selected in accordance with the selected loss of pressure at the paint spray gun.

2. A throttle device according to claim 1, wherein said annular passage has an annulus with a radial dimension smaller than 3 millimeters.

3. A throttle device according to claim 2, wherein said supporting means removably supports said core member in said tubular member.

4. A throttle device according to claim 3, wherein said support means is located adjacent at least one of the opposite ends of said core member.

5. A throttle device according to claim 4, wherein said support means includes a single member located adjacent one end of said core member.

6. A throttle device according to claim 5, wherein said one end of said core member is adjacent the inlet of the tubular member.

7. A throttle valve according to claim 3, wherein said tubular member further includes a tubular extension portion linearly and integrally extending from the portion of said member that defines said inner through hole between said inlet and said outlet with one of said inlet and said outlet being laterally formed, said extension portion having an additional inner through hole communicating with said inner through hole of said tubular member, and wherein said support means comprises an extension shaft portion linearly and integrally extending axially from said core member, said extension shaft portion being fitted in said extension portion.

8. A throttle device according to claim 7, wherein said extension shaft portion is axially adjustable to adjust the length of said tubular member.

9. A throttle device according to claim 8, wherein the inner diameter of the tubular extension is smaller in diameter than said inner through hole of said tubular member, and wherein said extension shaft portion of said support means is slidably fitted in said tubular extension portion of said tubular member and said support means further comprises means for securing said extension shaft portion at a desired axial position relative to said tubular extension.

10. A throttle device according to claim 1, wherein said core member has a selected pattern engraved on the outer cylindrical surface thereof for increasing flow resistance in the annular passage.

11. A throttle device for applying back pressure to a high viscosity paint in an airless paint supply system having a paint supply pump for supplying paint to a paint spray gun and through the throttling device, said throttling device, comprising:

a tubular member having an inlet and outlet at opposite ends and an inner surface defining a cylindrical axially extending through hole of uniform diameter;

an elongated core member having a uniform outer cylindrical surface concentrically disposed in the through hole and extending substantially throughout the length of the tubular member;

a pipe fitting member having an inner bore with at least one of the inlet and outlet ends being received in the inner bore for fitting the pipe fitting member to the tubular member;

support means mounting the core member in said concentric disposition;

the support means having an outer ring portion and an inner portion, the outer ring portion having an outer diameter with a dimension corresponding to the diameter of the inner bore of the pipe fitting member and an inner diameter larger than the inner diameter of the tubular member, the outer ring portion being mounted in axial abutment with the tubular member, the inner portion engaging and supporting the core member;

the cylindrical surface of the core member and the inner surface of the tubular members being diametrically dimensioned to define an annular passage between the inner surface of the tubular member and outer surface of the core member having an annulus of at least 1.5 millimeters in radial dimension to permit a flow of paint therethrough while maintaining a selected loss of pressure at the inlet of the paint spray gun; and the ratio of the axial length of the annular passage and the radial dimension of the annulus being determined in accordance with the selected loss of pressure at the paint spray gun.

12. A throttle device according to claim 11, wherein said core member has an axially extending end projection with a diameter smaller than the diameter of said core member, and wherein said inner portion of said support means includes an inner ring portion concentric with said outer ring portion and includes at least one bridge portion interconnecting said outer and inner ring portions, said inner ring portion having an inner diameter dimensioned for allowing said inner ring portion to fit on said end projection of said core member to support said core member coaxially in said tube member.

* * * * *